Sept. 2, 1941.  J. G. VINCENT  2,254,335
MOTOR VEHICLE
Filed March 7, 1939  6 Sheets-Sheet 2

INVENTOR.
Jesse G. Vincent
BY
Tibbetts & Hart
ATTORNEYS

Sept. 2, 1941.  J. G. VINCENT  2,254,335
MOTOR VEHICLE
Filed March 7, 1939  6 Sheets-Sheet 3

INVENTOR.
Jesse G. Vincent
BY
Tibbetts & Hart
ATTORNEYS

Sept. 2, 1941.   J. G. VINCENT   2,254,335
MOTOR VEHICLE
Filed March 7, 1939   6 Sheets-Sheet 4
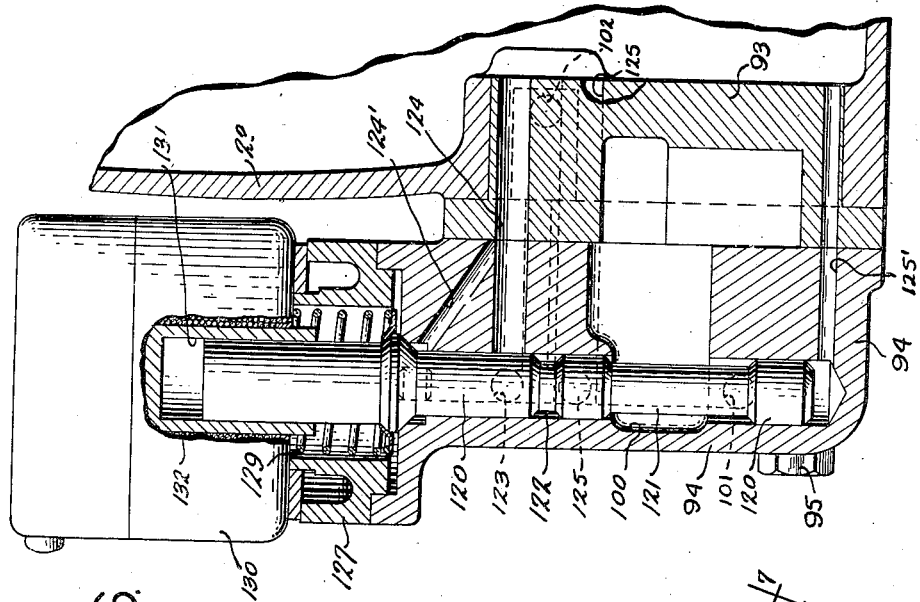
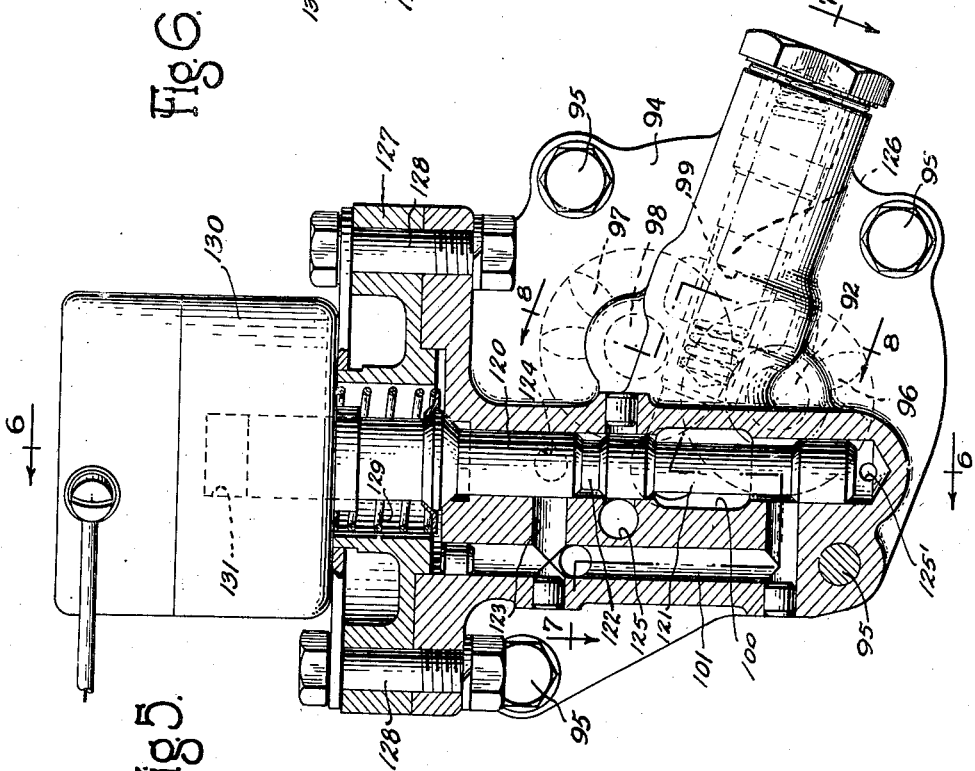
INVENTOR.
Jesse G. Vincent
BY
Sibbetts & Hart
ATTORNEYS Sept. 2, 1941.　　　J. G. VINCENT　　　2,254,335
MOTOR VEHICLE
Filed March 7, 1939　　　6 Sheets-Sheet 5
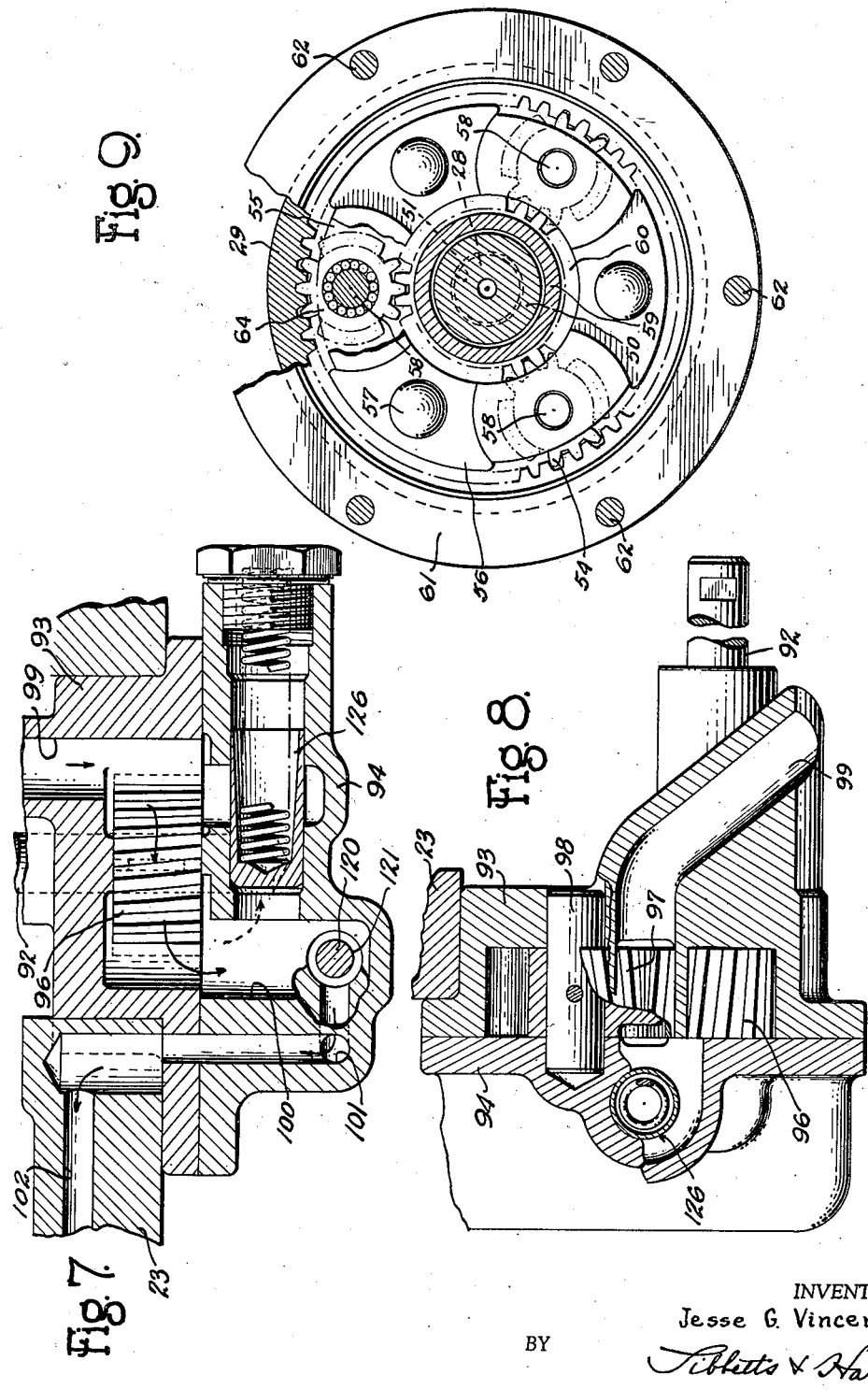
INVENTOR.
Jesse G. Vincent
BY
Tibbetts & Hart
ATTORNEYS Sept. 2, 1941.  J. G. VINCENT  2,254,335
MOTOR VEHICLE
Filed March 7, 1939  6 Sheets-Sheet 6

INVENTOR.
Jesse G. Vincent
BY
ATTORNEYS

Patented Sept. 2, 1941

2,254,335

UNITED STATES PATENT OFFICE 2,254,335

MOTOR VEHICLE

Jesse G. Vincent, Grosse Pointe, Mich., assignor to Packard Motor Car Company, Detroit, Mich., a corporation of Michigan Application March 7, 1939, Serial No. 260,405

17 Claims. (Cl. 74—328)

This invention relates to power transmitting mechanism and more particularly to such mechanism adapted for use in motor vehicles.

One of the objects of this invention is to provide power transmitting mechanism for motor vehicles that is of a character such that the driver can readily change the speed ratio when in direct drive without the usual hand shifting operation.

Another object of the invention is to provide power transmitting mechanism for motor vehicles with which the speed ratio can be reduced from direct drive and back to direct drive through manipulation of the accelerator pedal while the throttle valve is held wide open.

Another object of the invention is to provide power transmitting mechanism in which planetary gearing under manual control is associated with change speed gearing to vary the final drive speed ratio.

A further object of the invention resides in the control of planetary gearing associated with change speed gearing whereby a clutch or brake can be actuated automatically by mechanism under control of the driver.

Still another object of the invention is to provide motor vehicle power transmitting mechanism in which direct drive can be modified by fluid pressure and electrical systems under the combined control of a change speed shift rod and throttle valve operating mechanism.

Other objects of the invention will appear from the following description taken in connection with the drawings which form a part of this specification, and in which:

Fig. 5 is a vertical sectional view of the pump mechanism of the fluid pressure system when the power transmitting mechanism is in direct drive relation;

Fig. 6 is a sectional view of the pump mechanism taken on line 6—6 of Fig. 5;

Fig. 7 is another sectional view of the pump mechanism taken on line 7—7 of Fig. 5;

Fig. 8 is another sectional view of the pump mechanism taken on line 8—8 of Fig. 5;

Fig. 9 is a sectional view of the planetary gearing taken on line 9—9 of Fig. 1;

Figure 1:
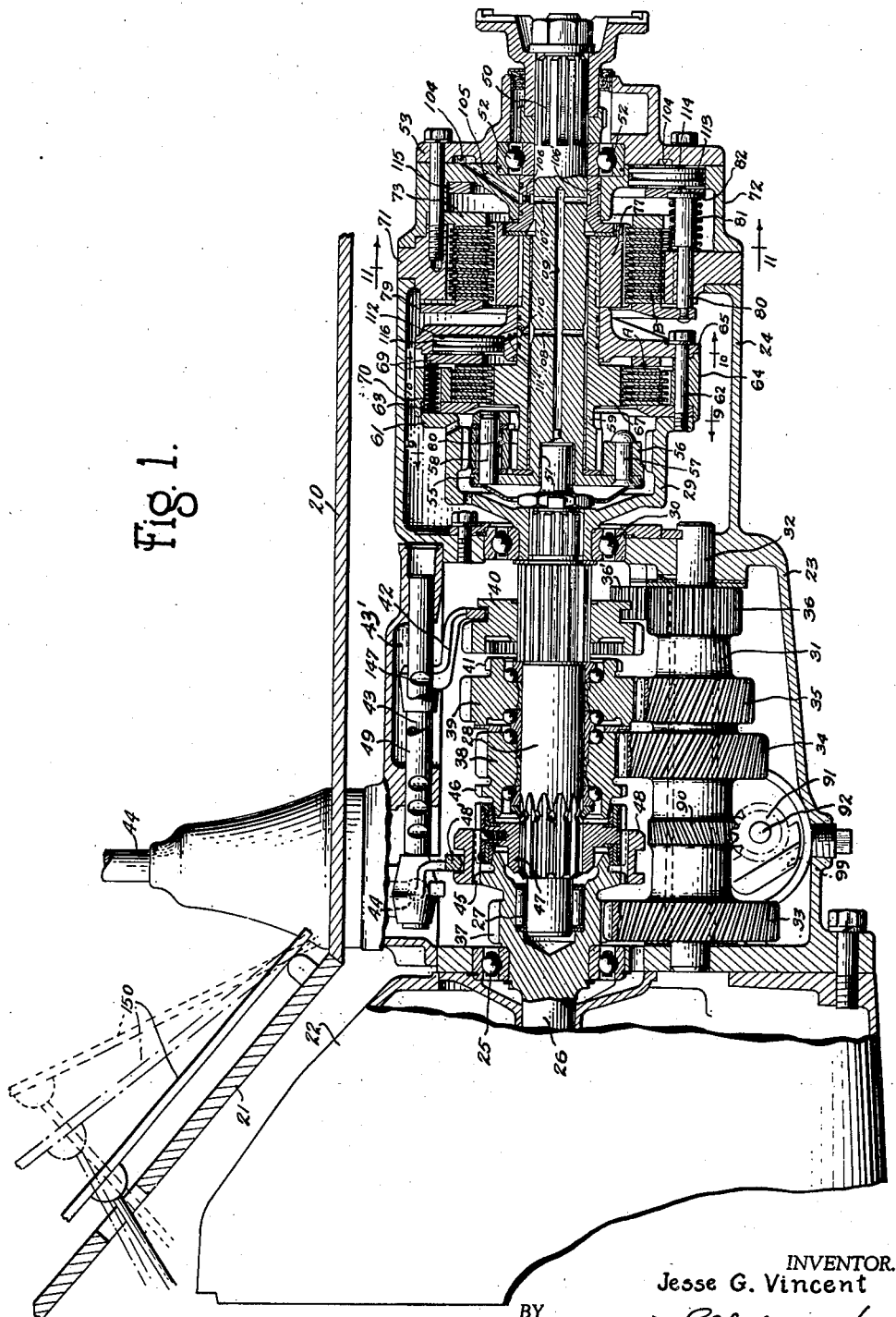
Fig. 1 is a vertical sectional view of a part of a motor vehicle showing power transmitting mechanism incorporating the invention, the mechanism being in underdrive or third speed relation.

The power transmitting mechanism herein described is designed for use where a plurality of driving speed ratios is desired, and it is particularly adapted for use in motor vehicles. The mechanism is shown arranged beneath the floorboard 20 and the toe board 21 in a conventional manner. The casing for the power transmitting mechanism comprises generally bolted together sections 22, 23 and 24. Section 22 houses a conventional main clutch and flywheel (not shown), section 23 houses change speed gearing for selectively containing a plurality of forward driving speed ratios and a reverse drive, and section 24 houses mechanism for obtaining a variable speed ratio between the change speed mechanism in section 23 and the driven shaft.

The front wall of casing 23 carries a suitable bearing 25 in which is mounted the enlarged rear end of drive shaft 26, which may be the vehicle clutch shaft, driven from the vehicle engine through conventional clutch mechanism (not shown). The enlarged end of the driving shaft is formed with an axial recess for the reception of bearing 27 that journals the forward end of the intermediate driving shaft, or tail shaft 28. The rear end of the intermediate driving shaft extends through the rear wall of casing section 23 and is splined in the hub of an interiorly toothed annulus or tool gear 29 journaled in bearing 30. A gear spool or countershaft 31 is mounted on shaft 32 in the casing section 23 and has fixed thereon gears 33, 34, 35 and 36. Gear 33 is in constant mesh with gear 37 formed on the enlarged end of the drive shaft 26, so that the countershaft is continuously connected in driven relation with the drive shaft. Gear 34 is also continuously in mesh with a gear 38 which is mounted for rotation on the intermediate driving shaft 28.

Gears 35 and 36 constitute the low speed and reverse gears respectively, gear 35 being continuously in mesh with gear 39 rotatably mounted on shaft 28 and gear 36 being continuously in mesh with a conventional idler gear 36'. A clutch and gear member 40 is slidably splined on the shaft 28 and has external teeth engageable with the reverse idler gear and internal clutch teeth engageable with clutch teeth 41 on gear 39. Shifter fork 42 engages the member 40 and is carried on shift rail 43 mounted in bearings in the cover portion 43' of the central casing section 23. The shift rail is selectively actuated by a shift lever 44 of usual form which may be manually operated by the vehicle driver in the well known manner.

Thus in the illustrated embodiment of the invention, member 40 may be moved to engage with gear 39, to provide a first forward speed, or connected through the idler gear 36' meshing with gear 36 to provide a reverse drive. Second forward speed is provided by connecting gear 38 with the intermediate shaft, and high forward speed is secured by coupling shafts 26 and 28 to provide direct drive. Gear 37 has clutch teeth 45 formed thereon and similar clutch teeth 46 are formed on gear 38. Between these clutch teeth is a movable synchronizing clutch having a hub section 47 splined to shaft 28 and a rim section 48, such sections having slidably engaging teeth and the teeth of the rim section being engageable with clutch teeth 45 or 46. When the clutch rim section engages teeth 45 direct drive is established between shafts 26 and 28, and when the rim section engages teeth 46 then gear 38 is coupled to the intermediate shaft and a second speed forward drive is established. The rim section of the clutch has a shifter fork 48' associated therewith which is mounted on shift rail 49 actuated by shift lever 44, such rail being mounted in bearings in the cover portion 43' of the casing section 23.

In the casing section 24 is a driven shaft 50 that aligns with shafts 26 and 28. The forward end of this driven shaft is formed with a recess 51 that journals on the pilot at the rear end of the intermediate shaft 28, and, as an additional support, the shaft 50 is journaled in bearing 52 carried by the rear wall 53 of the casing section 24.

A carrier for planet gears 54 is positioned within the toothed annulus 29 and consists of sections 55 and 56 secured together by rivets 57, the section 55 being an integral enlarged front end of the driven shaft 50. The planet gears are rotatably mounted on shafts 58 mounted on the carrier and mesh with tail gear 29. Telescoping the driven shaft is a tubular shaft 59 having a sun gear 60 formed on its forward end which lies between and meshes with the planetary gears.

The previously described driving relations of the gearing in casing section 23 transmits rotation to the annulus 29 and through the planetary gears to the driven shaft. Thus the drive is direct from shaft 28 to shaft 50 when the planetary gears are held stationary relative to the annulus, but when the planetary gears are free to rotate relative to the annulus then they transmit the drive from shaft 28 to shaft 50 at a reduced speed.

The planetary gearing is controlled to drive through the planetary gearing whenever the change speed gearing is connected for reverse, first or second speeds, and when set for direct drive the planetary gearing is locked to provide direct drive or is released so that the planetary gears can rotate relative to the gear 29 and provide a third speed or "underdrive." The planetary gearing is locked or released by clutch A and brake B that are actuated by springs and a fluid pressure system under control of an electrical system that is in turn manually controlled.

The rear end of the toothed annulus 29 is formed with a radially extending flange 61 and secured to such flange by bolts 62 is a sectional housing for clutch A consisting of backing plate 63, a rim 64 and a rear wall 65 that bears on sleeve shaft 59, such elements comprising the tail gear structure. The rim is slotted interiorly to drivingly engage plates 66 of clutch A and the sleeve shaft 59 is formed with a slotted hub 67 with which plates 68 of clutch A drivingly engage. Such plates 66 and 67 are alternately arranged and are engaged in driving relation by pressure plate 69 actuated by fluid pressure, springs 70 normally moving the pressure plate out of clutch engaging relation. When clutch A is engaged the sun gear will be fixed with the gear 29 so that the planetary gears will be locked thereby providing a direct drive from the shaft 28 to the shaft 50.

Figure 2:
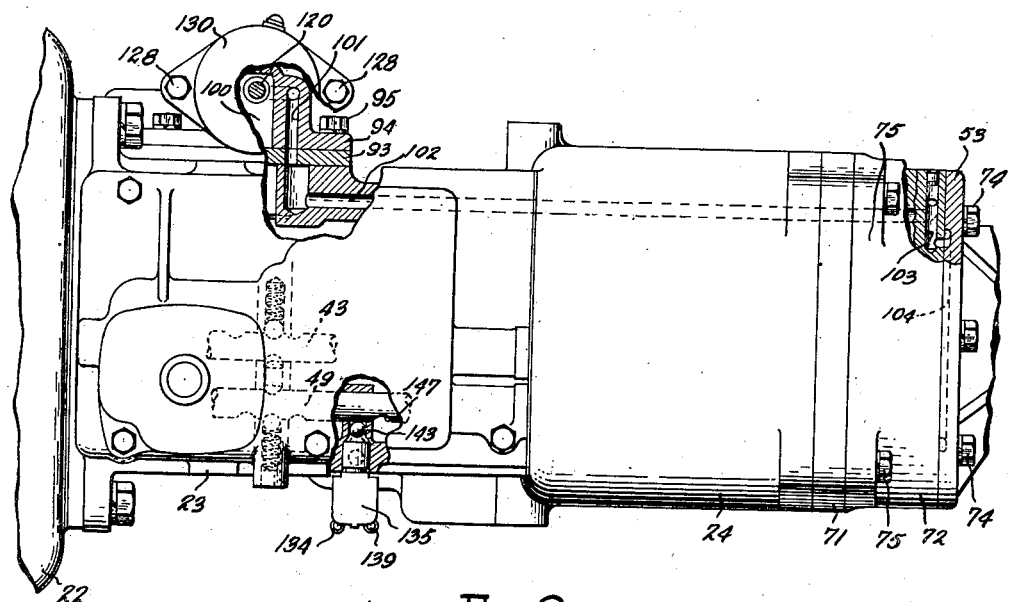
Fig. 2 is a top plan view, partly broken away, of the power transmitting mechanism in neutral position.

The housing for brake B comprises sections 71 and 72 of the casing 24 and backing plate 73 fixed between such sections by bolts 74 that also fix casing sections 72 and 53 to section 71. Bolts 75 secure sections 71 and 72 to the main portion of casing 24, see Fig. 2. The section 71 is in the form of a ring having an interiorly slotted wall with which the plates 76 drivingly engage, and splined on the sleeve shaft 59 is another ring member 77 having external splines in which plates 78 drivingly engage. The disk plates 76 and 78 are alternately arranged and are normally held engaged by a ring pressure plate 79 secured to a plurality of pins 80 slidably mounted in the casing section 71 and urged rearwardly by coil springs 81 arranged between the heads 82 of the pins and the casing section 71. This brake B is normally engaged by the springs and released by fluid pressure while clutch A is engaged by fluid pressure and normally released by springs. When brake B is engaged the sun gear shaft is held stationary with casing section 71 and the planetary gears transmit drive from shaft 28 to shaft 50 at a reduced speed.

The fluid actuating system for clutch A and brake B will now be described. On the countershaft 31 is fixed a gear 90 with which meshes gear 91 fixed on a pump shaft 92 carried in the casing section 23. This shaft extends into a pump housing consisting of sections 93 and 94 secured to the transmission casing 23 by bolts 95, the section 93 being formed to fit into an opening in the casing. Section 93 has a chamber therein for receiving meshing pump gears 96 and 97, the gear 96 being fixed on shaft 92 and the gear 97 being fixed on shaft 98 rotatably mounted in the pump housing. The housing is formed with a passage 99 that opens into the pump chamber and extends below the oil level in the bottom of casing 23 so that oil can be drawn by the pump from the casing into the chamber. The pump chamber has an outlet control chamber 100 in the housing and leading from this chamber is an outlet passage 101 that extends vertically and horizontally to communicate with a passage 102 formed in the cover portions of casings 23 and 24. This passage 102 opens into a feed passage 103 in casing section 72 that communicates with an annular recess or chamber 104 formed in the forward wall of the rear cover 53 of casing section 24. Passage 105 leads from chamber 104 to passage means 106 in the bearing 106' that will feed the oil to radial passages 107 in the driven shaft 50. Such radial passages are connected with forward radial passages 108 in shaft 50 by an axially extending passage 109. Passages 108 communicate with an annular recess 110 in the sleeve shaft 59 and passages 111 lead from this recess to a plurality of cylinders 112 formed in the member 65 of the housing of clutch A. The recess 104 communicates directly with a plurality of cylinders 113 formed in the casing section 72. Pistons 114 are arranged in cylinders 113 and they bear against a ring 115 with which the heads 82 of the pins are pressed by springs 81. Pistons 116, similar to pistons 114 in form, are arranged in cylinders 112 and bear against the pressure plate 69 of clutch A.

The fluid system is open to the pistons of both the clutch and the brake so that when effective clutch A will be engaged and brake B will be disengaged. When the hydraulic system is not effective then the springs 70 will release clutch A and the springs 81 will engage brake B.

Control means for the hydraulic system is shown associated with the pump housing. A vertically disposed rod 120 extends into passage 100 and has two reduced portions 121 and 122. When the reduced portion 121 overlies passage 101 oil will be free to flow to the cylinders of both clutches. When the reduced valve portion 122 overlies passage 123 leading from passage 101 to the valve passage 100, communication will be established with passage 124 so that the system will drain therethrough into the casing 23. Another drain passage 124' leads from the upper end of the valve chamber to the outlet end of passage 124 so that oil is free to flow therethrough regardless of the valve position. It will be observed that the reduced valve portions are arranged so that the drain 124 will be open when passage 101 is closed to the pump chamber and at such times the valve allows communication between the passage 100 and an outlet passage 125 allowing fluid to flow back into the casing 23. Thus a single valve element establishes or stops oil flow to the clutches, and opens or closes the drains from the pump and the feeding system. There is a drain passage 125' from the lower end of the valve chamber into the casing 23.

In order to maintain the pressure developed in the oil system within safe limits a balanced relief valve 126 is arranged in a passage in the pump housing leading from the pump chamber to the interior of casing 23. A cap 127 is secured on top of the valve housing of pump housing 94 by bolts 128. The valve extends through this cap and coil spring 129 engages the valve to normally hold it in position opening passage 101 to the pump and closing the drains. In such relation clutch A will be engaged and brake B will be disengaged so the planetary gearing will be locked, when the valve is closed then clutch A will be released by the springs 70 and brake B will be engaged by the springs 81.

In the illustrated embodiment of the invention, it is proposed to close the control valve of the fluid system by an electrical system under manual control. A solenoid 130 is mounted on top of the valve casing cap 127 and is recessed axially to form a chamber 131 into which the upper end of the valve member 120 projects. The solenoid winding 132 is grounded on the vehicle at 133 and is connected with terminal 134 of switch 135. The vehicle battery 136 is connected with the ignition switch 137 by wiring 138 and terminal 139 of switch 135 is connected to the ignition switch. Terminal 140 of switch 141 is also connected with the ignition switch. The terminal 140' of switch 141 is connected by wiring 142 with terminal 134 of switch 135. The movable contactor 143 of switch 135 having a ball at one end is normally opened by spring 144 and the movable contactor 145 of switch 141 is normally opened by coil spring 146. The arrangement is such that the solenoid circuit can be established only while the ignition switch is turned on.

Figure 3:
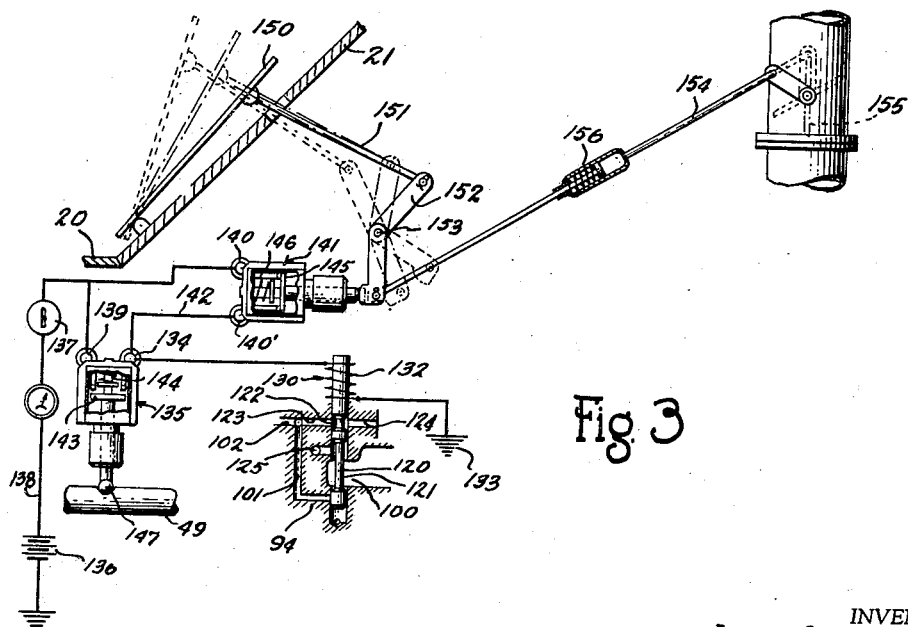
Fig. 3 is a diagrammatic view of the control means for the fluid pressure system utilized to actuate clutch mechanism in the power transmitting mechanism shown in underdrive position.
Figure 4:
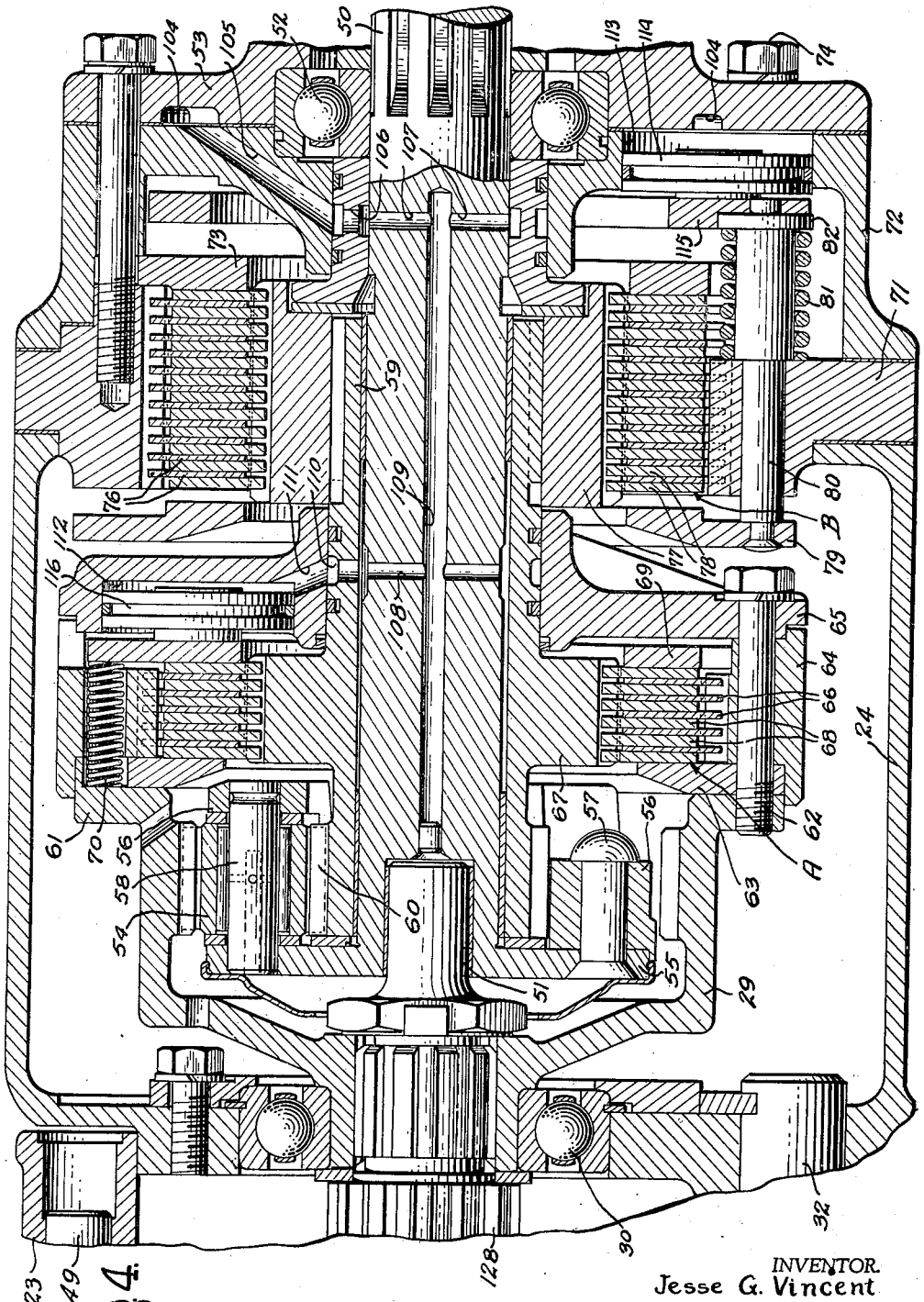
Fig. 4 is an enlarged vertical sectional view of the planetary gearing and associated clutch and brake shown in Fig. 1 but in direct drive relation.
Figures 10, 11:
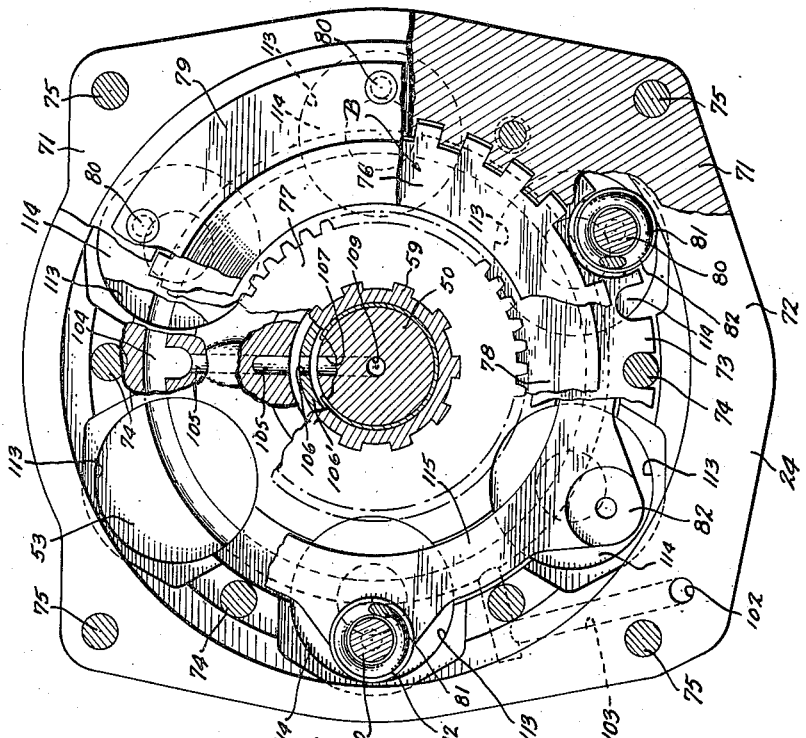
Fig. 10 is a sectional view of one of the clutch mechanisms taken on line 10—10 of Fig. 1.
Fig. 11 is a sectional view of the brake mechanism taken on line 11—11 of Fig. 1.

As pressure is desired to engage clutch A and to disengage brake B only when the shifter rods are moved to establish direct drive between shafts 26 and 28, the rod 49 is utilized to control switch 135. Normally the contactor 143 is pressed into circuit establishing position by engagement of the ball end with such rod, and a recess 147 is formed in the rod in a position to allow the contactor to be moved out of circuit establishing relation by its spring when the rod is in a position to engage clutch 48 with clutch 45, that is, establishing direct drive. In order to provide an "underdrive" or third speed drive while clutches 45 and 48 are engaged, it is only necessary to energize the solenoid so that the hydraulic system will be closed to clutch A and brake B and this is accomplished by closing switch 141. A desirable manner of accomplishing such modification is to utilize the accelerator pedal 150 so that the driver will not have to shift the driving position of his hands or feed. The accelerator pedal link 151 is connected to a bell crank 152 pivoted at 153 on the vehicle and a rod 154 connects the bell crank with the engine fuel intake throttle valve 155. This rod has a lost motion connection 156 so that it can be extended after the throttle valve has been moved to full open position. The bell crank is arranged to engage and move contactor 145 to closed position upon further depression of the accelerator pedal beyond full open throttle valve position, the lost motion connection permitting such operation, as shown in full lines in Fig. 3. The normal range of acceleration operation is shown by dotted lines in Fig. 3. Thus when clutch 48 is engaged with clutch 45 the drive will be direct from shaft 26 to 50 with the accelerator pedal in any position less than full open throttle valve position, but when the pedal is beyond full throttle valve opening position as shown in Figs. 1 and 3, the drive will be reduced through the planetary gearing to provide "underdrive" or third speed forward. The shift between direct drive and "underdrive" or third speed is controlled by operation of the accelerator pedal.

Whenever the ignition is turned on, except when the clutch element 48 is moved into engagement with clutch 45, rail 49 will maintain switch 135 closed to establish a circuit through the solenoid 130. Energizing of the solenoid coil will move the valve 120 by magnetic force to its uppermost position and thereby cut off flow of fluid from the pump to the passage 102 so that the springs 70 will release clutch A and the springs 81 will engage brake B. With such clutch and brake arrangement the drive from shaft 28 to shaft 50 will be reduced through the planetary gearing. The drive is reduced in this manner in reverse, first and second speeds.

When the change speed gearing is adjusted to provide a direct drive through clutch 48 engaging with clutch 45 then the contactor of switch 135 will be projected by its spring into recess 147 in the shift rail 49, thereby deenergizing the solenoid and allowing spring 129 to move valve 120 to open position so that there is fluid flow from the pump to clutch A and brake B. Under such circumstances and as long as the accelerator 150 is not moved beyond full throttle opening position, fluid flow to clutch A and brake B will continue, and, under such conditions, clutch A is closed and brake B is opened so that the planetary gearing is locked and direct drive is established between shaft 28 and 50. Third speed forward is obtained by actuation of the accelerator when the change speed gearing is in direct drive relation, in other words, the accelerator is utilized to modify a direct drive in order to provide a third speed forward. When this third speed forward is desired the accelerator is depressed beyond full throttle opening position whereupon the bell crank 152 will actuate contactor 145 to close switch 141 and thereby energize the solenoid so that the valve will be closed and fluid to clutch A and brake B will be shut off. Under such condition the planetary gearing will be unlocked and will be free to rotate so that the drive from shaft 28 to 50 is reduced. By releasing pressure on the accelerator the bell crank 152 can be moved to allow the contactor 145 to open switch 141 whereupon the circuit to the solenoid is deenergized and spring 129 will return the control valve to open position whereupon clutch A will be engaged and brake B disengaged to reestablish direct drive between shafts 28 and 50.

It will be observed that the clutches are controlled automatically by the shift rail switch in reverse, first and second speeds and these three speeds can be selectively established by the usual operation of the change speed shift lever. High speed, that is direct drive, is likewise obtained by the usual manipulation of the shift lever and the third speed forward is obtained by depressing the accelerator beyond the normal full throttle opening position and the driver can thus make the shift from direct into third speed or from third speed back to direct by varying his pressure upon the accelerator pedal. The entire fluid pressure system is constructed to exclude air and to drain so that there will be no interference with power application to the clutch and brake when required. The fluid system utilizes the lubricating oil in the change speed gearing casing to provide the power for applying clutch A and brake B. The entire power transmitting structure is light and of simple construction. The controls are accurate and quickly effective.

Although the invention has been described in connection with a specific embodiment, the principles involved are susceptible of numerous other applications which will readily occur to persons skilled in the art. The invention is therefore to be limited only as indicated by the scope of the appended claims.

What is claimed is:

1. In a power transmitting mechanism having a pair of shafts connected by planetary gearing, control mechanism for the gearing comprising a clutch and a brake, actuator means associated with said clutch and said brake to normally engage one and to disengage the other, a fluid pressure system acting on both said clutch and said brake in opposition to said actuator means, a valve for controlling fluid flow through said system to said clutch and said brake, spring means normally opening said valve, an electro-magnetic system for closing said valve when energized, and throttle valve control mechanism operable to make or break said electro-magnetic system, said pressure system being effective only so long as the valve is held open.

2. In a power transmitting mechanism having a variable speed gearing mechanism including a tail gear and shift rod means operable to effect different speed rations to the tail gear, a driven shaft, planetary gearing connecting the tail gear with the driven shaft, a clutch and a brake operable to lock or release the planetary gearing and establish a direct drive or reduced drive between the tail gear and the driven shaft, a fluid pressure system controlling said clutch and said brake, a valve in said pressure system, an electric system for actuating said valve, a switch in said electric system controlled by said shift rod means, and a manually controlled switch in said electric system.

3. In a motor vehicle, a throttle valve control element, a power transmitting mechanism including shift rods and planetary gearing, a clutch means and a brake means associated with said planetary gearing to establish a direct or reduced drive therethrough, a fluid pressure and spring system for actuating said clutch means and said brake means, a spring opened valve controlling flow in said fluid system to said clutch and brake means, an electric system including a solenoid for opening said valve, switch means in the electric system closed by one of said shift rods to establish the solenoid circuit, except in one shift position, another switch in said electric system operable to establish the solenoid circuit when the first switch means is ineffective and operated by said control element when moved beyond a position fully opening the throttle valve.

4. In a motor vehicle, a change speed mechanism including a shift rail, planetary gearing driven by said mechanism, a clutch operable to lock or release said planetary gearing, clutch operating means, an electrical system for controlling said clutch operating means, said shift rail being associated to energize said electrical system under certain gear ratio conditions in said mechanism, and throttle valve actuating mechanism operable to energize said electrical system when said shift rail is ineffective to energize the electrical system.

5. In a motor vehicle, change speed mechanism including a shift rail, means driven by said mechanism, a clutch operable to vary the driving speed of said means, a fluid pressure system associated to actuate said clutch, a valve in said system, and valve operating means under control of said shift rail.

6. In a motor vehicle, a casing, a driven shaft in the casing, a driven gear structure in the casing into which one end of said driven shaft extends, planetary gears carried by said end of the driven shaft in meshing relation with said driven gear structure, a sleeve shaft loosely mounted on said driven shaft having a sun gear fixed thereon and meshing with said planetary gears, a pair of means on said sleeve shaft, one of said pair of means being engageable with said casing and the other of said pair of means being engageable with said driven gear structure, spring means normally disengaging one of said pair of means and engaging the other of said pair of means, and a controlled fluid pressure system associated with said pair of means acting oppositely to said spring means, said system including pistons engaging the pair of means and passage means in the casing and the driven shaft open to the pistons.

7. In a motor vehicle power transmitting mechanism, change speed mechanism comprising a casing, a tail gear, structure including cylinders, pistons in the cylinders, a driven shaft, a sun gear carrying sleeve on the shaft, planetary gearing carried by the driven shaft in meshing relation with the tail gear structure and the sun gear, a clutch between the sleeve and the tail gear structure arranged to be engaged by said pistons, springs for normally disengaging said clutch, cylinders in the rear of the casing, pistons in the rear cylinders, a brake in advance of the rear cylinders for connecting the sleeve with the casing, spring means normally engaging the brake, the pistons in the rear cylinders being operable to disengage the brake, and a controlled fluid pressure system leading to all of said cylinders.

8. In a motor vehicle, a casing, change speed mechanism in the casing running in oil, mechanism driven by said change speed mechanism, clutch and brake means separately operable for establishing direct or reduced drive through said driven mechanism, pistons for controlling said clutch and brake means, oil passage means leading to said pistons, a pump driven by the change speed mechanism and associated to force oil from the casing to the pistons, said pump having an oil shunting passage and a drain passage, and a valve operable to release or stop oil flow from the pump to the pistons and to control the drain and shunt passages.

9. In a motor vehicle, an oil containing casing, power transmitting mechanism in said casing, clutch mechanism, clutch actuating pistons, passage means in the casing leading from the pump to the pistons, a drain from the passage means to the interior of the casing, an oil shunt and drain in the pump, and valve means operable to open or close said passage means and said drains and shunt.

10. In a motor vehicle, power transmitting mechanism including a clutch and brake controlled planetary gearing, a fluid pressure system for actuating the clutch and the brake, valve means controlling the pressure system, and means under two sources of manual control for actuating said valve, the first of said sources of manual control being ineffective when the power transmitting mechanism is in direct drive and the second source of manual control being effective to modify the direct drive when the first manual control is ineffective.

11. In a motor vehicle, power transmitting mechanism including planetary gearing, a clutch for controlling said planetary gearing, a fluid pressure system for actuating the clutch, a pump in the fluid pressure system, a control valve in the fluid pressure system, a solenoid associated to actuate said valve, a pair of switches for energizing said solenoid, a shift rail operative to close one of said switches except in one position of its adjustment, and throttle actuating mechanism for closing the other of said switches when said first mentioned switch is ineffective to energize the solenoid, said throttle mechanism being effective to actuate the associated switch only when moved beyond full throttle opening position.

12. Control means for a fluid pressure system in power transmitting mechanism comprising a control valve, a spring normally holding the control valve in open position, an electrical system including a solenoid for moving said valve into closed position, a switch in said electrical system, a shift rod for holding said switch in closed position except when shifted to establish direct drive through the power transmitting mechanism, and a manually controlled switch in the electrical system adapted to be actuated to energize said circuit when the other switch is open.

13. In a motor vehicle, change speed mechanism including a pair of shift rails and a tail gear, one of said rails having a recess therein, a driven shaft, planetary gearing drivingly connecting the tail gear with the driven shaft, a pair of means for locking said planetary gearing to provide a direct drive between the tail gear and the driven shaft or to establish a reduced drive between said tail gear and said driven shaft, a fluid pressure system associated with said pair of means, an electrical system associated to control the fluid pressure system, a switch in said electrical system normally held closed by the shifter rod with the recess and allowing the switch to open when the recess lies adjacent the switch, and another switch manually operable when the first mentioned switch is allowed to open by the rail recess.

14. In a motor vehicle, a power transmitting mechanism comprising a change speed mechanism tail gear, a driven shaft, a sun gear fixed on a shaft rotatably mounted on the driven shaft, planetary gearing carried by the driven shaft and meshing with the tail gear and the sun gear, a housing carried by the tail gear, a means in said housing for engaging the sun gear shaft with the housing, spring means normally disengaging said engaging means, pistons carried by the housing adapted to engage said clutch, cylinders in the housing surrounding said pistons, a second means associated with said sun gear shaft, a fixed housing for said second means, spring means for normally closing said second means, pistons for releasing said second means and cylinders for the last mentioned pistons, a fluid pressure system open to the cylinders of both said means, and control means for the fluid pressure system.

15. In a motor vehicle having change speed gearing including a shift rail, a driven shaft, and planetary gearing connecting said shafts, control apparatus for said planetary gearing comprising a clutch operative to lock or release said gearing, a fluid system operable to actuate said clutch, a valve in said system, an electric system for actuating said valve including a switch, and switch actuating mechanism, said switch actuating mechanism being located to be operated by said shift rail.

16. In a motor vehicle drive mechanism, change speed gearing, planetary gearing adapted to be driven by said change speed gearing, means for changing the drive through the change speed gearing including a shiftable rail, means for controlling the drive through the planetary gearing, a fluid pressure system operable to actuate said drive controlling means, and means responsive to movement of said shift rail for controlling the application of said fluid pressure system to said drive controlling means.

17. In a motor vehicle, change speed drive gearing, planetary gearing driven by said change speed gearing, means operable to shift the drive through the change speed gearing including a shiftable rail, engine throttle control mechanism, means for controlling the planetary gearing to provide a direct or modified drive therethrough, means operable to shift said planetary gearing controlling means, and control mechanism for said shift means responsive to movement of said rail and to actuation of said throttle control mechanism.

JESSE G. VINCENT.

CERTIFICATE OF CORRECTION.

Patent No. 2,254,335.   September 2, 1941.

JESSE G. VINCENT.

It is hereby certified that error appears in the printed specification of the above numbered patent requiring correction as follows: Page 1, second column, line 20, for "containing" read --obtaining--; page 3, first column, line 16, after "disposed" insert the word --valve--; line 52, after the comma and before "when" insert --but--; and second column, line 23, for the word "feed" read --feet--; and page 4, first column, line 72, claim 2, for "rations" read --ratios--; and that the said Letters Patent should be read with this correction therein that the same may conform to the record of the case in the Patent Office.

Signed and sealed this 16th day of December, A. D. 1941.

(Seal)

Henry Van Arsdale,
Acting Commissioner of Patents.